C. F. M. VAN BERKEL.
STACK FORMER FOR SLICING MACHINES.
APPLICATION FILED JUNE 28, 1917.
1,310,261.                              Patented July 15, 1919.
                                              4 SHEETS—SHEET 1.
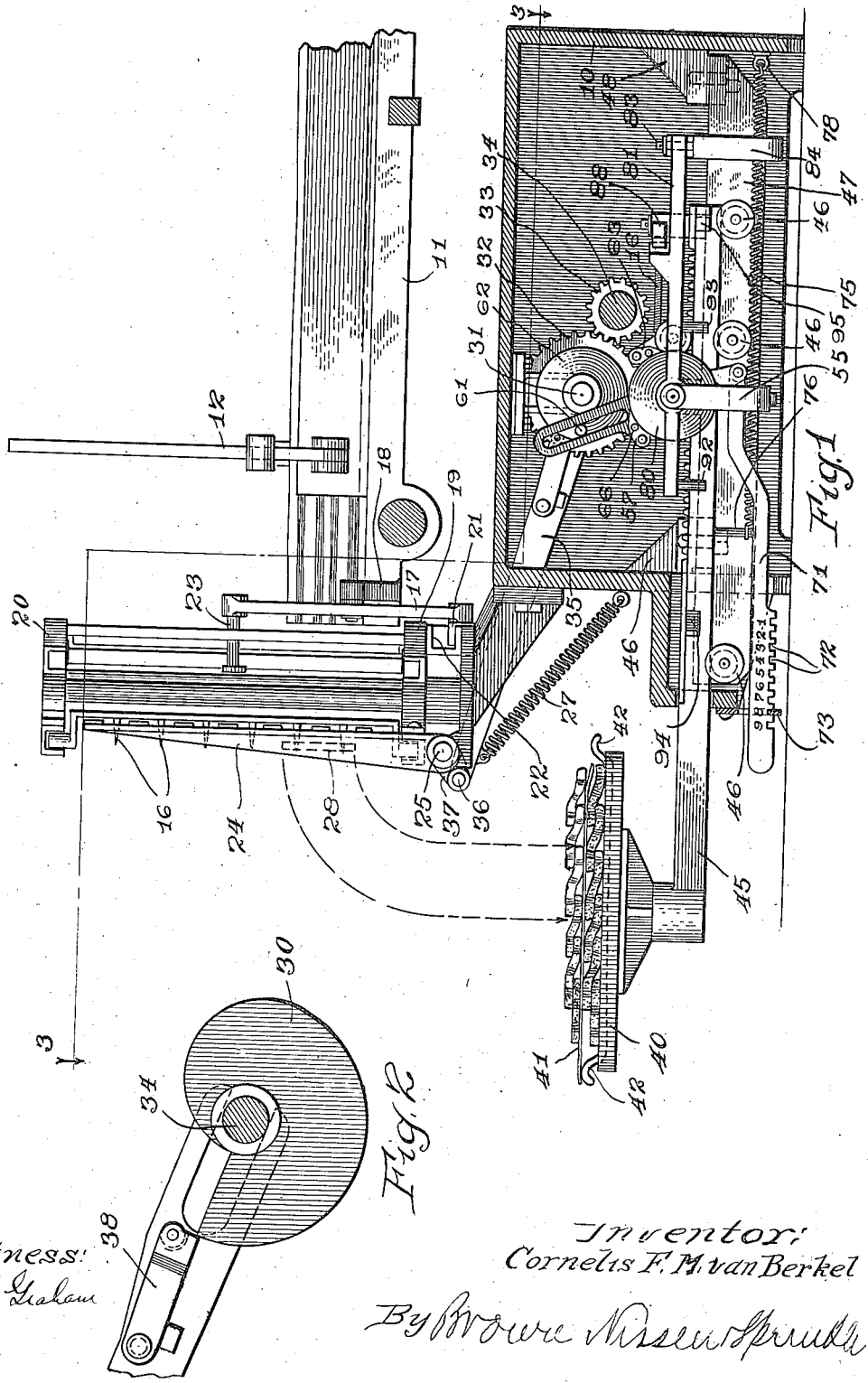
Inventor:
Cornelis F. M. van Berkel
By Brown Nissen Spruth
Att'ys.
Witness:
L. B. Graham C. F. M. VAN BERKEL.
STACK FORMER FOR SLICING MACHINES.
APPLICATION FILED JUNE 28, 1917.
1,310,261. Patented July 15, 1919.
4 SHEETS—SHEET 2.
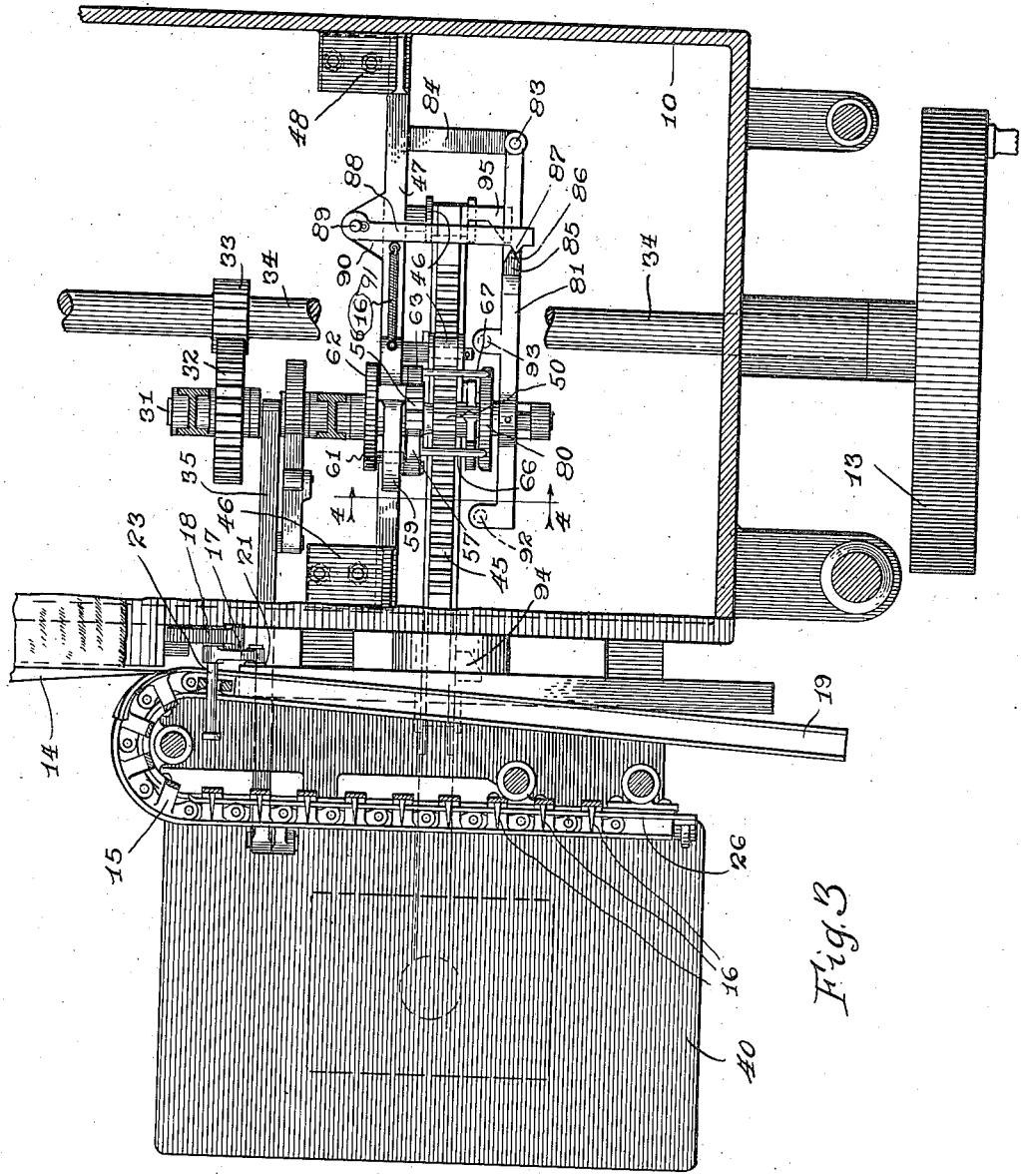
Witness:
L. B. Graham
Inventor:
Cornelis F. M. van Berkel
By
Att'ys.

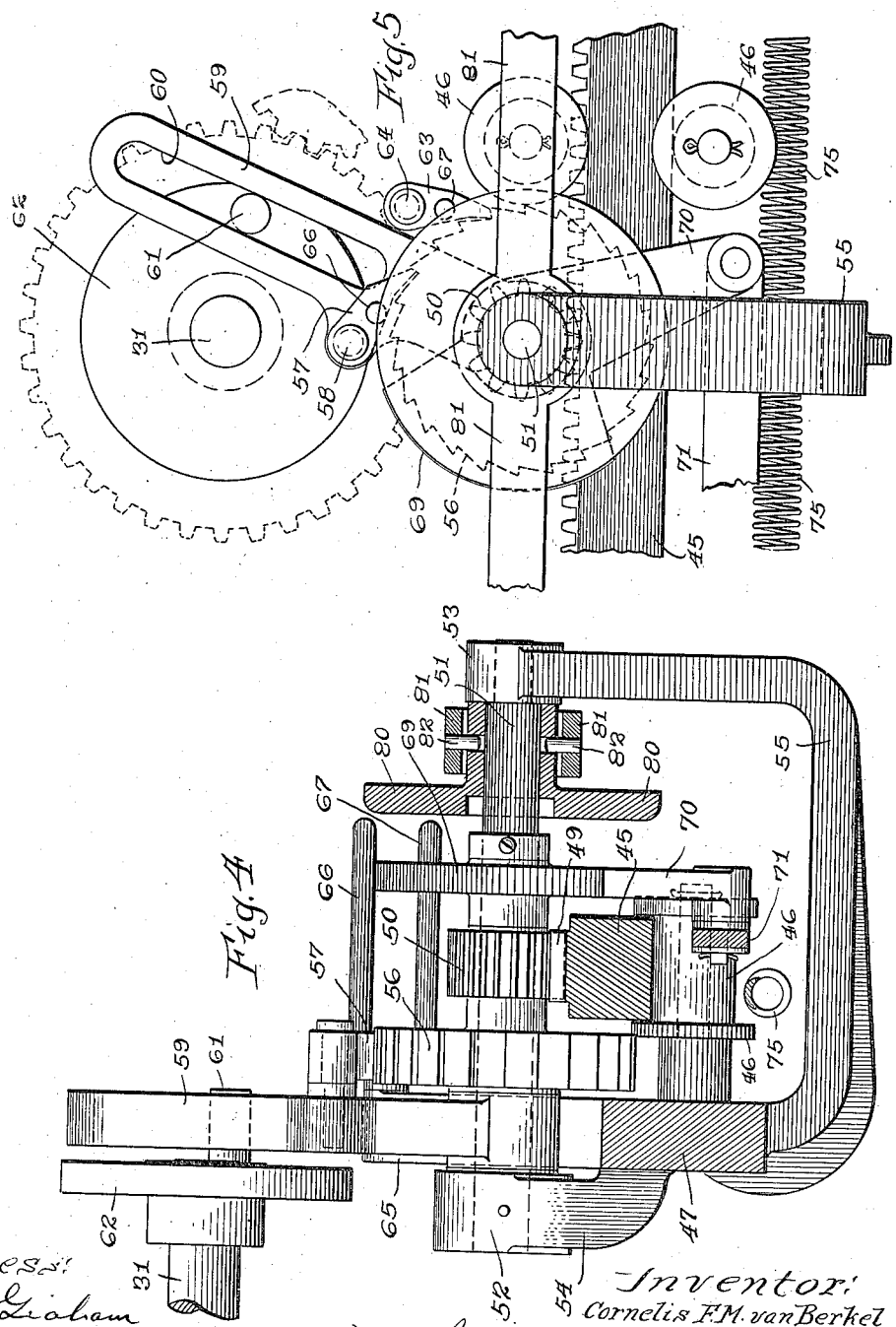

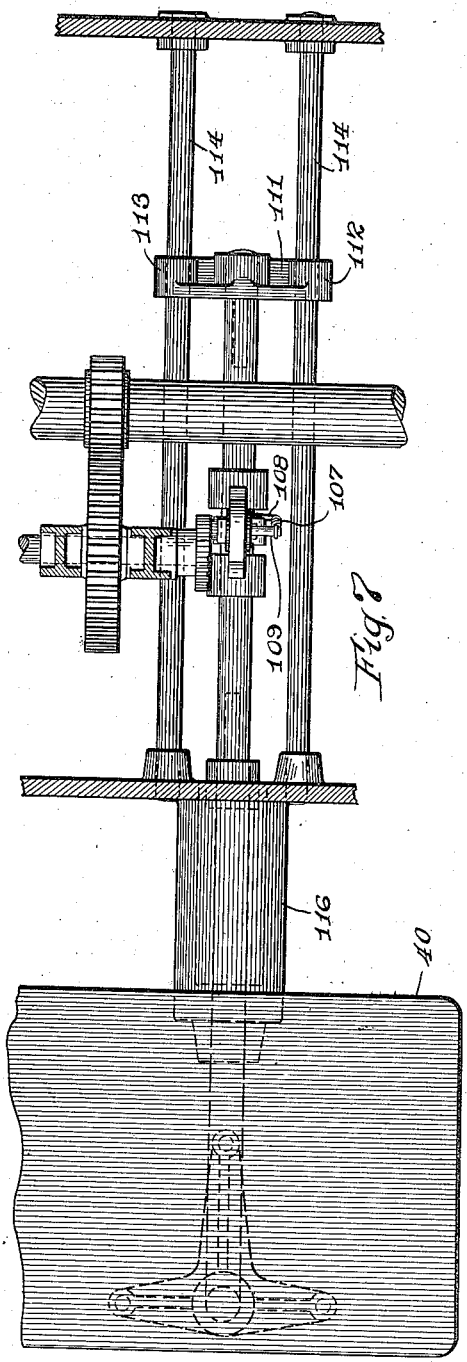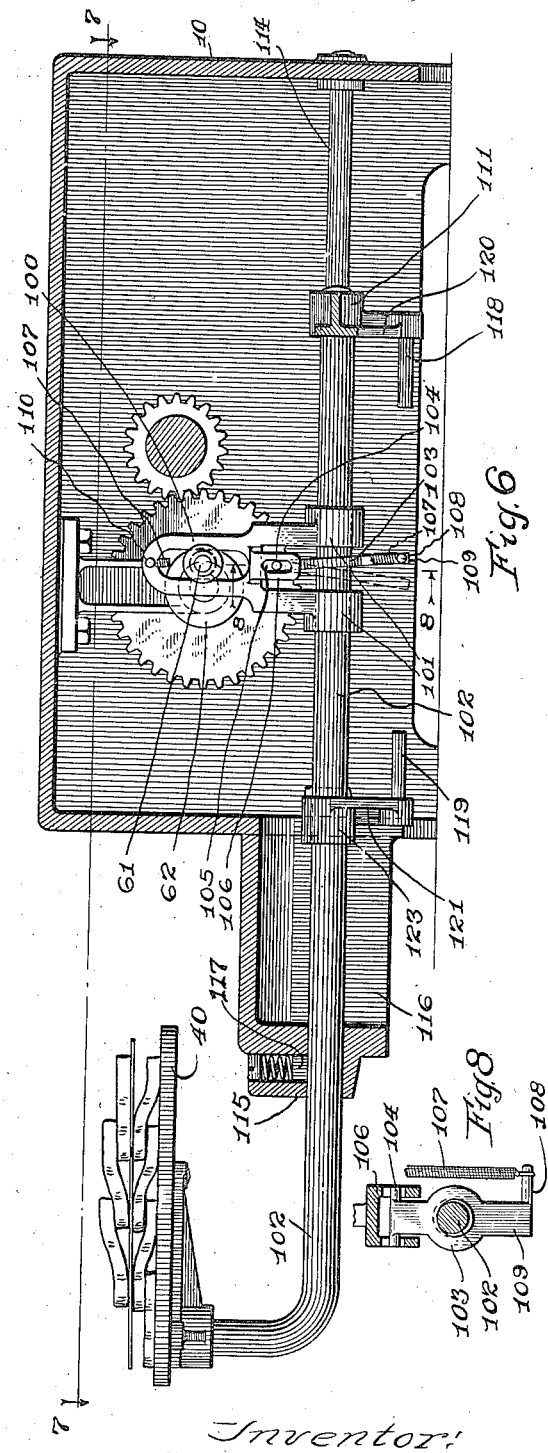

UNITED STATES PATENT OFFICE.

CORNELIS F. M. van BERKEL, OF LAPORTE, INDIANA, ASSIGNOR TO U. S. SLICING MACHINE COMPANY, OF LAPORTE, INDIANA, A CORPORATION OF INDIANA.

STACK-FORMER FOR SLICING-MACHINES.

1,310,261. Specification of Letters Patent. Patented July 15, 1919.

Application filed June 28, 1917. Serial No. 177,462.

*To all whom it may concern:*

Be it known that I, CORNELIS F. M. VAN BERKEL, a subject of the Queen of the Netherlands, and a resident of Laporte, in the county of Laporte and State of Indiana, have invented certain new and useful Improvements in Stack-Formers for Slicing-Machines, of which the following is a specification.

This invention relates to mechanism for disposing of slices of material formed by a slicing machine, and has for its object the provision of a device of the class named which shall be of improved construction and more efficient and convenient in operation than similar devices previously known.

The invention is exemplified in the combination and arrangement of parts shown in the accompanying drawings and described in the following specification, and it is more particularly pointed out in the appended claims.

In the drawings—

Figure 1 is a vertical sectional view of a portion of a slicing machine showing one form of the present invention connected thereto.

Fig. 2 is an enlarged detail of one feature of the invention.

Fig. 3 is a horizontal sectional view on line 3—3 of Fig. 1.

Fig. 4 is a horizontal sectional view on line 4—4 of Fig. 3.

Fig. 5 is a side elevation of the mechanism shown in Fig. 4.

Fig. 6 is a vertical sectional view of a portion of a slicing machine showing a modified form of the invention.

Fig. 7 is a horizontal sectional view on line 7—7 of Fig. 6; and

Fig. 8 is a detail sectional view on line 8—8 of Fig. 6.

Referring first to Figs. 1 to 5, inclusive, the numeral 10 designates the frame or base of a slicing machine provided with the usual reciprocating table 11, meat clamp 12, hand-wheel 13, and slicing knife 14. These parts of the machine operate in the usual and well known manner. Mechanism similar to that shown and claimed in my United States Letters Patent No. 1,290,425, is provided for receiving the slices as they are formed and for discharging them downwardly in a flatwise position. This mechanism comprises a conveyer 15 provided with prongs or spikes 16 which enter the slices of meat as they are formed and carry the slices into a position from which they are discharged onto the receiving mechanism to be described. The conveyer 15 is operated by a lever 17 which is connected to a bracket 18 secured to the reciprocating table 11. By this mechanism the conveyer is caused to move in unison with the reciprocating table and the piece of meat being cut, during a slicing operation, and is also fed around a curve, at the completion of the slicing operation, into the discharge position. The conveyer is guided in its travel by upper and lower grooves or run-ways 19 and 20 respectively. In order to impart a supplementary forward movement to the table, the lower end of the lever 17 is provided with a cam roller 21 which operates in a channel or guideway 22 secured to the frame of the machine and provided with a downwardly curved portion at the end adjacent the slicing knife to retard the movement of the roller 21 and thus impart an additional movement to the operating pin 23 at the upper end of the lever 17 which is connected with the conveyer. By this arrangement the slice is carried entirely around the curve in the guides 19 and 20 and into the proper position to be discharged from the teeth 16. The discharge of the slice is accomplished by means of a fly 24 secured to an oscillatory shaft 25 and provided with arms 26 which enter between the teeth 16 of the conveyer in a position behind the slices carried on the points of the teeth. At the proper period in the operation of the conveyer, the fly 24 is operated by a coil spring 27 and caused to rotate about the axis of the shaft 25 into a horizontal position, thus carrying the slice 28, Fig. 1, through the path indicated by the broken lines and arrow points in that figure. A suitable stop device is provided for checking the movement of the fly when it reaches a horizontal position, and the slice continues to fall downwardly until it reaches the receiver to be described. After the discharge of the slice, the fly 24 is returned to its initial position by a cam 30 secured to a shaft 31 connected by a gear 32 and pinion 33 with the main drive shaft 34 of the slicing machine. The cam 30 operates a bar 35 which is pivotally connected at 36 to an arm 37 secured to the shaft 25.

A pivoted bearing piece 38 is provided for the periphery of the cam 30 so that it will yield to permit reverse rotation of the shaft 34 if such rotation is desired. The mechanism thus far described is that shown and claimed in the co-pending application referred to and is the form of stacker which I prefer to use in combination with the other parts of the invention to be described. It should be understood, however, that other forms of mechanism may be employed for receiving the slices as they are cut and for discharging them onto a receiving platform.

In slicing certain kinds of meat and other material, and especially in slicing bacon, the slices may be arranged in an attractive manner by forming them in a series of layers and arranging the slices of each layer so that they overlap one another, as indicated in Fig. 1 of the drawings. To accomplish this result a receiving table or platform 40 is provided in position to intercept the slices as they are discharged from the fly 24, and the position of this table is shifted a certain amount after the discharge of each slice so that the next slice will be displaced an amount equal to the movement of the table relative to the slice previously discharged and a layer of slices will thus be formed, each slice overlapping the preceding one. Mechanism is provided for repeating this operation in order to form as many layers of slices as the operator may wish, the different layers resting one on top of the other, and a piece of paper 41 may be interposed between the different layers if desired. A tray 42 may be placed upon the receiving table 40 at the beginning of a slicing operation and after the desired amount of material has been sliced, the tray may be lifted from the receiving table and placed in a display window or upon the salescounter, where the slices present an attractive appearance. As the material is sold to customers each layer may be wrapped with the paper directly beneath it so that it is unnecessary for the attendant to touch the meat in any way, and after each sale a fresh layer will be exposed to attract the attention of additional customers.

The receiving table 40 is supported at the forward end of a rack bar 45 which travels on guide rollers 46 pivotally mounted on a supporting bar 47 secured to brackets 48 at opposite sides of the machine base 10. The upper surface of the rack bar 45 carries teeth 49 which mesh with a pinion 50 secured to a shaft 51 which is rigidly mounted in bearings 52 and 53 connected with the bar 47 by brackets 54 and 55 respectively. The pinion 50 is formed integral with a ratchet 56 which is operated by a pawl 57 pivotally mounted at 58 on an arm 59 journaled on the shaft 51 adjacent one face of the ratchet wheel 56. The arm 59 is provided with a slot 60 which coöperates with a pin 61 projecting from the face of a crank disk 62 rigidly secured to the end of the shaft 31. The shaft 31, as previously explained, is rotated from the main shaft 34 by means of the gears 32 and 33, and this rotation will cause a feeding operation of the ratchet 56 once for each rotation of the shaft. Since this same shaft controls the operation of the fly 24 to discharge a slice for each rotation, it is apparent that the ratchet wheel will be moved once for each slice discharged, and since the ratchet is connected by the pinion 50 and the rack bar 45 to the table 40, the table will be shifted each time a slice is discharged upon it. The parts are so related to one another that the slice will be deposited upon the table during the return movement of the pawl 57, or while the table is at rest. A holding pawl 63 is mounted at 64 on a bracket 65 rigidly connected to the bar 47 to hold the ratchet 56 against reverse movement. The pawls 57 and 63 are provided with horizontally extending pins 66 and 67 respectively by means of which the operation of the pawls is controlled. An arcuate segment or shroud 69 is pivoted on the shaft 51 for limiting the operative stroke of the pawl 57. The position of the shroud 69 may be adjusted by means of a downwardly extending arm 70 and a link 71 provided with a series of notches 72 arranged to coöperate with a holding bar or detent 73 connected to the frame of the machine in a convenient position. By shifting the bar 73 to different positions, the effective stroke of the pawl 57 may be changed and thus the amount of movement of the table 40 for each slice varied at the will of the operator.

The ratchet mechanism described imparts an intermittent movement to the table 40 in a direction away from the frame of the machine, or to the left, as viewed in Fig. 1. This movement is resisted by a coil spring 75 having one end attached to a rod 76 projecting downwardly from the rack bar 45 and having its opposite end secured to an eye 77 attached to the rear portion of the machine frame. The spring 75 is gradually brought under tension as the receiver is fed by the ratchet mechanism until a limiting position of the table is reached at which time the pawls 57 and 63 are forced out of engagement with the teeth of the ratchet. The disengagement of the pawls from the ratchet 56 is accomplished by means of a disk 80 which is slidably mounted on the outer end of the shaft 51 opposite the ends of the control rods 66 and 67 for the pawls. When the disk 80 is shifted to the left, as viewed in Fig. 4, the periphery of the disk is forced beneath the ends of the rods 66 and 67 and the pawls are thus lifted out of engagement with the ratchet teeth. As soon as this occurs the spring 75 will return the rack bar 45 and the table 40 to its initial position. The disk 80 is shifted by means of a lever 81 connected to the disk by pins 82 and provided with a pivotal support 83 carried on a bracket 84 secured to the supporting bar 47, as shown best in Figs. 1 and 3. A projection 85 extends upwardly from the upper surface of the lever 81 and is provided with a V-shaped portion 86 on one of its upright edges. A coöperating V-shaped projection 87 is carried near the end of a control lever 88 pivoted at 89 on a lug 90 secured to the supporting bar 47. A coil spring 91 normally draws the V-shaped projections 86 and 87 toward one another. By this arrangement the lever 81 will always be rotated to one or the other of its extreme positions about the pivot 83. The lever is shifted from one position to the other at each extremity of the movement of the rack bar 45. The lever carries a pair of downwardly extending pins 92 and 93 by means of which it is shifted laterally to move the disk 80 into and out of engagement with the operating pins 66 and 67. The pins 92 and 93 coöperate with cam pieces 94 and 95 respectively secured to the lateral face of the rack bar 45 in position to strike the pins 92 and 93 at opposite extremities of the movement of the rack bar. The rack bar 45 is gradually fed outwardly by the ratchet mechanism against the tension of the spring 75 during a slicing operation until the cam lug 95 comes into engagement with the pin 93. When this occurs the beveled surface of the lug by means of its contact with the pin will shift the lever 81 to the left, as viewed in Fig. 3, until the V-shaped bearings 86 and 87 pass one another at which time the spring 91 will continue the movement of the lever 81 into the position shown in that figure. This will bring the disk 80 into engagement with the pins 66 and 67 and thus release the pawls from the ratchet and permit the spring 75 to retract the rack bar 45. If it is found desirable, a buffer may be provided for absorbing the shock when the rack bar is brought to a stop. The bar is permitted to move inwardly a sufficient distance however to bring the cam block 94 into contact with the pin 92 and thus withdraw the disk 80 from engagement of the pins 66 and 67 and restore the pawls 57 and 63 into operative relation with the ratchet. This will cause the intermittent movement of the table 40 to begin again to form another layer of slices on top of the first. In this way the table is gradually fed outwardly by an intermittent movement until a layer of slices is formed across the surface of the table, and the table is then quickly returned to its initial position and a second layer formed on top of the first in a similar manner. As previously stated, the operator may place a sheet of paper on top of each layer as it is completed if he so desires.

In the form of the invention shown in Figs. 6 and 7, intermittent movement is imparted to the table in both directions, and in this case there is no necessity for a quick return of the table. The disk 62 in this form of the invention carries a pin 61 just as in the form previously described, but coöperating with the pin 61 is a reciprocatory member 100 provided with sleeves 101 which slide upon a longitudinally movable bar 102 which is used in place of the rack bar 45 in the form of invention previously described. Surrounding the bar 102 between the sleeves 101 is a clutch ring 103 pivotally supported at 104 in a slot 105 formed in a lug 106 carried by the reciprocating member 100. The ring 103 is mounted sufficiently loosely on the bar 102 to permit it to assume an angular position relative to the bar so that it will grip the bar and cause it to move in unison with the reciprocating member 100. A coil spring 107 is attached to a pin 108 carried on an extension 109 at the lower side of the clutch loop 103, and has its upper end secured to a second pin 110 carried at the upper end of the reciprocating member 100 and in vertical alinement with the pivot pin 104. This spring will hold the clutch loop 103 at one side or the other of the vertical plane of the pivot pin 104, the tendency of the spring being to retain the loop on either side of the vertical in which it happens to be placed. The bar 102 at its rear end is rigidly secured to a cross-head 111 which is provided with bearings 112 and 113 arranged to slide on guide rods 114 extending transversely from one side to the other of the base frame 10. The forward end of the bar 102 slides through a bearing 115 in the front portion of a housing 116 which projects from the front wall of the base frame 10 and which carries a friction plug 117 bearing on shaft 102. A pair of stops 118 and 119 are carried by downwardly projecting brackets 120 and 121 respectively, the bracket 120 being secured to the cross-head 111, and the bracket 121 being secured to the bar 102 by means of a sleeve 123 rigidly attached to the sliding bar.

When the member 100 is reciprocated by rotation of the crank pin 61 while the clutch loop 103 is in the position shown in Fig. 6, the bar 102 will be fed to the left, as viewed in that figure, by an intermittent movement. The clutch loop 103 will grip the bar and cause it to move in unison with the member 100 while that member is being moved to the left, but on the return movement the clutch loop 103 will slide freely along the bar 102 since the pressure on the clutch loop is in a direction to loosen the grip of the loop upon the bar and the plug 117 prevents reverse movement of the bar. In this form of device the slice-handling mechanism is timed to deposit a slice upon the table 40 at one extremity of the movement of the reciprocating member 100, that is, at the time when the crank pin 61 is passing dead center relative to the reciprocating member. When the bar 102 and the table 40 have been fed to the left a sufficient amount to bring the stop 118 into contact with the projection 109 on the clutch loop 103, the clutch loop will be shifted past its central position to the position shown in broken lines in Fig. 6. Further reciprocation of the member 100 will then cause a step by step movement of the rod 102 and the table 40 in the opposite direction. This will cause the slice-handling mechanism to deposit a second layer of slices upon the layer already formed, but overlapping in a reverse direction, as shown in the figure.

I claim:—

1. In combination, a slicing machine, and means for receiving the slices from said machine as they are formed thereby and for depositing said slices in a plurality of superimposed layers.

2. In combination, a slicing machine, and mechanism operating in synchronism with said machine for depositing the slices formed by said machine in a plurality of superimposed layers, the slices of each layer being arranged with overlapping portions.

3. The combination with a slicing machine, of a table for receiving the slices formed by said machine, mechanism for imparting motion to said table to cause the slices to be deposited thereon in overlapping relation, and means for reversing the direction of movement of said table to permit the deposit of a second layer of slices upon the first.

4. In combination, a slicing machine, mechanism for discharging slices formed by said machine successively in substantially the same position relative to said machine, a table for receiving the slices, and mechanism for reciprocating said table relative to the position of discharge of said slices.

5. In combination, a slicing machine, a table for receiving slices formed by said machine, means for imparting an intermittent movement to said table in one direction, and means for returning said table to its initial position to permit a repetition of the intermittent movement thereof.

6. In combination, a slicing machine, means for discharging slices therefrom, a receiver for said slices, means for imparting an intermittent movement in one direction to said receiver, and means for imparting a quick return movement to said receiver.

7. In combination, a slicing machine, a rigid table for receiving slices from said machine, and means for imparting an intermittent movement to said table to cause the slices to be arranged in overlapping relation thereon.

8. In combination, a slicing machine, a rigid table for receiving slices from said machine, a bar for supporting said table, and means for imparting a step by step movement to said bar.

9. In combination, a slicing machine, a receiver for slices formed by said machine, a bar for supporting said receiver, ratchet mechanism for imparting a step by step movement to said bar, and resilient means for returning said bar to its initial position.

10. In combination, a slicing machine, a rigid table for receiving slices from said machine, a bar for supporting said table, ratchet mechanism for imparting a step by step movement to said bar in one direction, a spring arranged to oppose said movement, and means for releasing said ratchet mechanism to permit return movement of said bar under the tension of said spring.

11. In combination, a slicing machine, a support having a movable tray thereon for receiving slices from said machine, and means for shifting said support to cause the slices to be deposited upon said tray in layer formation.

12. In combination, a slicing machine, a conveyer for receiving the slices formed by said machine, a device for discharging the slices from said conveyer downwardly in flatwise position, a receiver spaced below the discharge position of said slices a sufficient distance to permit the formation of a stack of slices comprising a plurality of layers, and means for shifting the position of said table to cause the deposit of said slices in layer formation.

13. In combination, a slicing machine, means for discharging slices therefrom, mechanism for imparting uniform speed of operation to said discharging means independent of the speed of said slicing machine, a receiver for the slices discharged from said machine, and means for shifting the position of said receiver after the discharge of each slice to cause the next succeeding slice to be deposited in offset relation to the preceding slice.

14. In combination, a slicing machine, a conveyer for receiving slices from said machine, a spring-actuated fly for discharging slices from said conveyer, a table for receiving the slices, ratchet mechanism operated in timed related with the movement of said fly for shifting the position of said table in the interim between the deposit of the slices on said table, means for regulating the amount of such movement, a spring for returning said table to its initial position, and mechanism for limiting the aggregate movement of said table and for releasing said ratchet mechanism to permit the operation of said spring to return said table.

15. In combination, a slicing machine, mechanism for depositing the slice formed by said machine in a plurality of superimposed layers, and means for distributing the slices of each layer in different positions in the direction of the plane of the layer.

16. The combination with a slicing machine, of a table for receiving the slices formed by said machine, mechanism for imparting motion to said table to cause the slices to be distributed over the surface of said table relative to one another, and means for reversing the direction of movement of said table to permit the deposit of a second layer of slices upon the first.

In testimony whereof I have signed my name to this specification on this 25th day of June, A. D. 1917.

CORNELIS F. M. van BERKEL.